US008620373B2

(12) United States Patent
Ashikhmin et al.

(10) Patent No.: US 8,620,373 B2
(45) Date of Patent: Dec. 31, 2013

(54) POWER ALLOCATION IN A WIRELESS SYSTEM WITH BASE STATIONS HAVING ANTENNA ARRAYS

(75) Inventors: Alexei Ashikhmin, Morristown, NJ (US); Thomas Marzetta, Summit, NJ (US)

(73) Assignee: Alcatel Lucent, Paris (FR)

( * ) Notice: Subject to any disclaimer, the term of this patent is extended or adjusted under 35 U.S.C. 154(b) by 248 days.

(21) Appl. No.: 13/021,177

(22) Filed: Feb. 4, 2011

(65) Prior Publication Data

US 2012/0201283 A1    Aug. 9, 2012

(51) Int. Cl.
*H04B 7/00*    (2006.01)
(52) U.S. Cl.
USPC ........... 455/522; 455/69; 455/226.3; 455/135
(58) Field of Classification Search
USPC .......... 455/69, 522, 67.11, 513, 450, 442, 68,
455/517, 512, 504, 135, 226.3, 226.2;
370/334, 267, 347, 335, 336, 337, 329,
370/252, 328, 343
See application file for complete search history.

(56) References Cited

U.S. PATENT DOCUMENTS

| | | | | |
|---|---|---|---|---|
| 6,377,555 | B1 * | 4/2002 | Lee et al. ....................... | 370/252 |
| 6,879,572 | B1 * | 4/2005 | Ayyagari et al. ............... | 370/335 |
| 8,094,625 | B2 * | 1/2012 | Walton et al. .................. | 370/334 |
| 2002/0173309 | A1 * | 11/2002 | Shahidi et al. ................. | 455/442 |
| 2005/0208961 | A1 * | 9/2005 | Willenegger ................... | 455/522 |
| 2006/0083211 | A1 * | 4/2006 | Laroia et al. ................... | 370/343 |
| 2007/0066230 | A1 * | 3/2007 | Zhang et al. ................ | 455/67.11 |
| 2007/0243894 | A1 * | 10/2007 | Das et al. ....................... | 455/522 |
| 2009/0186648 | A1 * | 7/2009 | Larsson ......................... | 455/522 |
| 2010/0220626 | A1 * | 9/2010 | Das et al. ....................... | 370/252 |
| 2011/0019625 | A1 * | 1/2011 | Zhang et al. ................... | 370/329 |
| 2011/0085611 | A1 * | 4/2011 | Laroia et al. ................... | 375/260 |
| 2012/0021753 | A1 * | 1/2012 | Damnjanovic et al. ........ | 455/450 |
| 2012/0224555 | A1 * | 9/2012 | Lee et al. ....................... | 370/329 |

FOREIGN PATENT DOCUMENTS

EP    1 028 543    8/2000

OTHER PUBLICATIONS

Jubin Jose, et al., "Pilot Contamination Problem in Multi-Cell TDD Systems", (pp. 2184-2188) University of Texas at Austin, Bell Laboratories, Alcatel-Lucent Inc. Jun. 28-Jul. 3, 2009.
Thomas L. Marzetta, "How Much Training is Required for Multiuser MIMO?" (pp. 359-363), Bell Laboratories, Lucent Technologies.
Thomas L. Marzetta, "Noncooperative Cellular Wireless with Unlimited Numbers of Base Station Antennas", (pp. 3590-3600), IEEE Transactions on Wireless Communications, vol. 9, No. 11, Nov. 2010.
Partial International Search Report dated Mar. 21, 2012, issued in Application No. PCT/US2012/023236.
International Preliminary Report on Patentability and Written Opinion issued in International Patent Application No. PCT/US2012/023236, dated Aug. 15, 2013.

* cited by examiner

*Primary Examiner* — Tan Trinh
(74) *Attorney, Agent, or Firm* — Harness, Dickey & Pierce

(57) ABSTRACT

Provided is a method and apparatus for allocating transmit power in a wireless network. The method includes determining powers at which a base station transmits downlink signals to each active user equipment associated with the base station such that each of the downlink signals is associated with a different active user and the base station is permitted to transmit downlink signals with different powers to the associated active user equipments. The method further includes transmitting the associated downlink signals, by the base station, to the active user equipments at the determined powers.

20 Claims, 4 Drawing Sheets

POWER ALLOCATION IN A WIRELESS SYSTEM WITH BASE STATIONS HAVING ANTENNA ARRAYS

BACKGROUND OF THE INVENTION

1. Field

Embodiments relate to power allocation in Wireless multiple-input-multiple-output (MIMO) systems with base stations having relatively large antenna arrays.

2. Description of the Related Art

Wireless Time Division Duplex (TDD) multiple-input-multiple-output (MIMO) systems represent an advance in wireless communication. MIMO systems employ two or more antennas at the transmitting and/or receiving ends of a wireless link. The multiple antennas improve data transmission rates, while holding radio bandwidth and power constant.

A MIMO transmitter transmits an outgoing signal using multiple antennas by demultiplexing the outgoing signal into multiple sub-signals and transmitting the sub-signals from separate antennas. MIMO exploits the multiple signal propagation paths to increase throughput and reduce bit error rates. Using MIMO techniques the rate of transmission increases linearly depending on the local environment.

A typical TDD wireless system may service a relatively large geographic area organized in relatively smaller geographic units known as cells. Each cell includes a base station serving n mobiles also called mobile users, or user equipments, etc. All user equipments in all cells send pilot signals to the corresponding base stations. In each cell n user equipments send orthogonal pilot signals $v_k$, k=1, ..., n to the associated base station.

As is known, when the number of antennas associated with a base station in a MIMO system becomes very large the performance of the system virtually stops depending on additive noise, which is necessarily present in the receiver of each base station antenna (e.g., electronic equipment associated with each antenna which may be processing signals arrived to that antenna). However, increasing data transmission rates becomes difficult due to inter-cell interference caused by contamination of downlink signals transmitted to user equipment located in different cells.

Contamination of downlink signals is caused by the contamination of pilot signals arriving at a base station from user equipment located in different cells.

The contamination of the pilot signals is unavoidable due to reuse of the pilot sequences by user equipments associated with base stations in different cells. In other words, if a k-th user equipment associated with a base station in cell 1 uses pilot $v_k$ and in a neighboring cell 2 there is a user equipment associated base station in cell 2 that also uses pilot $v_k$, then the downlink signal transmitted from the base station in cell 1 to the k-th user in cell 1 interferes with the downlink signal transmitted from the base station 2 to the k-th users in cell 2.

SUMMARY OF THE INVENTION

One embodiment includes a method for allocating transmit power in a wireless network. The method includes determining powers at which a base station transmits downlink signals to each active user equipment associated with the base station such that each of the downlink signals is associated with a different active user and the base station is permitted to transmit downlink signals with different powers to the associated active user equipments. The method further includes transmitting the associated downlink signals, by the base station, to the active user equipments at the determined powers.

One embodiment includes a base station including a controller. The controller is configured to determine powers at which the base station transmits downlink signals to each active user equipments associated with the base station such that each of the downlink signals is associated with a different active user and the base station is permitted to transmit downlink signals with different powers to the associated active user equipments. The controller is further configured to transmit the associated downlink signals, using a plurality of antennas associated with the base station, to the active user equipments at the determined powers.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
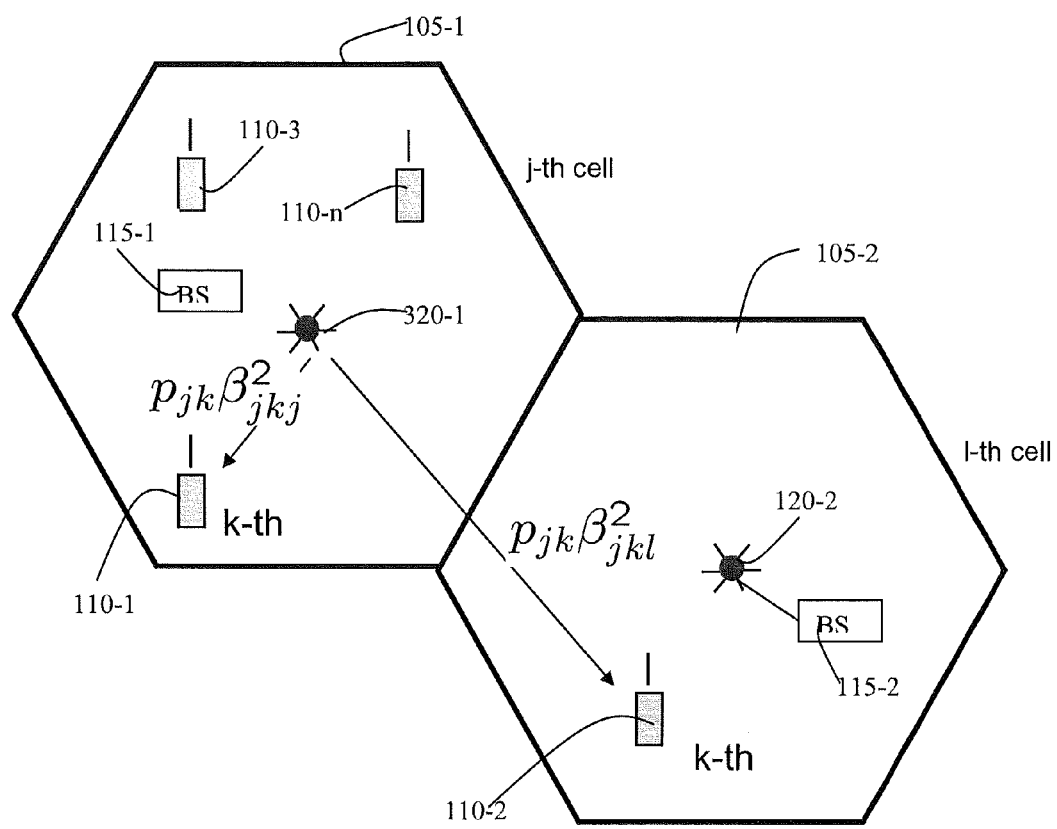
FIG. 1 illustrates a portion of a multiple-input-multiple-output (MIMO) wireless broadcast system according to example embodiments.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural buns as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

As used herein, the tetra "user equipment" (UE) may be considered synonymous to, and may hereafter be occasionally referred to, as a client, mobile unit, mobile station, mobile user, mobile, subscriber, user, remote station, access terminal, receiver, etc., and may describe a remote user of wireless resources in a wireless communication network.

Similarly, as used herein, the term "base station" may be considered synonymous to, and may hereafter be occasionally referred to, as a Node B, extended Node B, base transceiver station (BTS), etc., and may describe a transceiver in communication with and providing wireless resources to mobiles in a wireless communication network. As discussed herein, base stations may have all functionally associated with conventional, well-known base stations in addition to the capability to perform the methods discussed herein.

FIG. 1 illustrates a portion of a multiple-input-multiple-output (MIMO) wireless broadcast system according to example embodiments. Example embodiments will be described in the general sense with respect to the conventional MIMO system in FIG. 1. The MIMO system of FIG. 1 may use time division duplexing (TDD) or frequency division duplexing (FDD). However, it will be understood that example embodiments may be implemented in other MIMO systems as well as other wireless communication systems.

Referring to FIG. 1, cells 105-1 and 105-2 include base stations 115-1, 115-2 having antennas 120-1 and 120-2 respectively. Cell 105-1 includes user equipments 110-1, 110-3, 110-n and cell 105-2 includes user equipment 110-2. As shown in FIG. 1, antenna 120-1 transmits a downlink signal to user equipment 110-1 and that downlink signal may also propagate to user equipment 110-2. As is described above, the downlink signal transmitted by antenna 120-1 to user equipment 110-2 may cause inter-cell interference with signals transmitted by antenna 120-2 to user equipment 110-2.

For the purposes of discussing example embodiments associated with FIG. 1 and the subsequent equations, cell 105-1 is the j-th cell and cell 105-2 is the l-th cell. Further, for the purposes of discussing example embodiments associated with FIG. 1 and the subsequent equations, user equipment 110-1 is the k-th mobile with regard to the j-th cell 105-1 and user equipment 110-2 is the k-th mobile with regard to the l-th cell 105-2. Further, the k-th mobile in the j-th cell and the k-th mobile in the l-th cell use the same pilot sequence (e.g., $v_k$).

As illustrated in FIG. 1, the downlink signals transmitted by antenna 120-1 and received by users 110-1 and 110-2, respectively, may be mathematically described as $p_{jk}\beta_{jkj}^2$ and $p_{jk}\beta_{jkl}^2$ respectively. Where $p_{jk}$ is the power with which the j-th base station (e.g., base station 115-1) transmits to the k-th mobile (e.g., user equipment 110-1) in the j-th cell (e.g., cell 105-1), $\beta_{jkj}$ are the slowly fading coefficients between the j-th base station (e.g., base station 115-1) and the k-th mobile (e.g., user equipment 110-1) in the j-th cell (e.g., cell 105-1), and $\beta_{jkl}$ are the slowly fading coefficients between the j-th base station (e.g., base station 115-1) and the k-th mobile (e.g., user equipment 110-2) in the k-th cell (e.g., cell 105-2).

Based on the above equations, the Signal to Interference Ratio (SIR) of the t-th user equipment (e.g., user equipment 110-2) in the l-th cell (e.g., cell 105-2) is:

$$SIR_{lk} = \frac{p_{lk}\beta_{lkl}^2}{\sum_{j \neq l} p_{jk}\beta_{jkl}^2}$$ Equation 1

Based on equation 1, intuitively the smaller the power $p_{jk}$, the smaller the interference created by the j-th base station to any user equipment in other cells. However, if $p_{jk}$ is too small the downlink signal transmitted to the k-th user equipment in the j-th cell by a base station in the j-cell will be too weak for the k-th user equipment to use the downlink signal.

The maximum possible data transmission rate for the k-th user equipment in the l-th cell may be approximately equal to:

$R_{lk} \approx \log(1+SIR_{lk}+\text{additive noise})$ Equation 2

As is known, if a base station includes a relatively large number of base station antennas, the additive noise may be relatively small. Therefore, equation 2 becomes:

$R_{lk} \approx \log(1+S/R_{lk})$ Equation 3

A known performance measure in wireless systems is the smallest transmission data rate among N % (e.g., N=95%) of the best user equipments (e.g., the smallest SIR among N % of user equipments). In other words we drop (100−N) % of the worst user equipments and analyze the smallest SIR of the remaining N % users (e.g., 95% of the user equipments). This rate may be represented as $S/R_N$. Example embodiments provide at least one method for choosing base station transmit powers $p_{lk}$ that maximize $SIR_N$ (e.g., the N user equipments with the lowest SIR).

Figure 2:
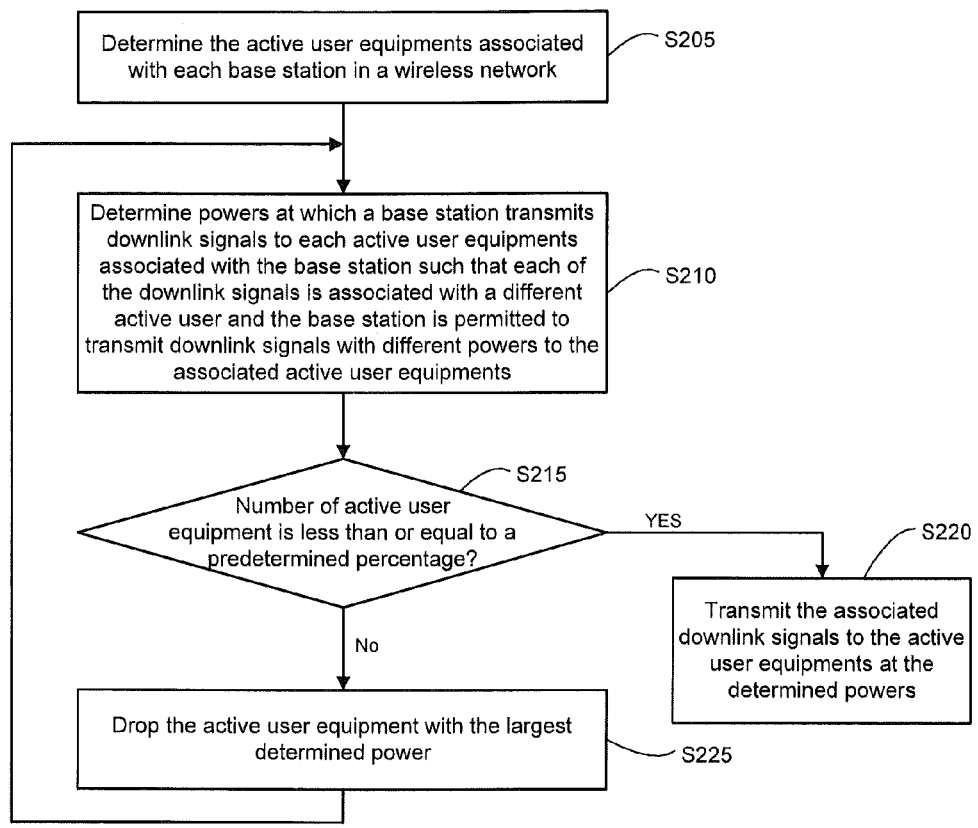
FIG. 2 illustrates a method for allocating power in a multiple-input-multiple-output (MIMO) wireless broadcast system according to example embodiments.
Figure 3:
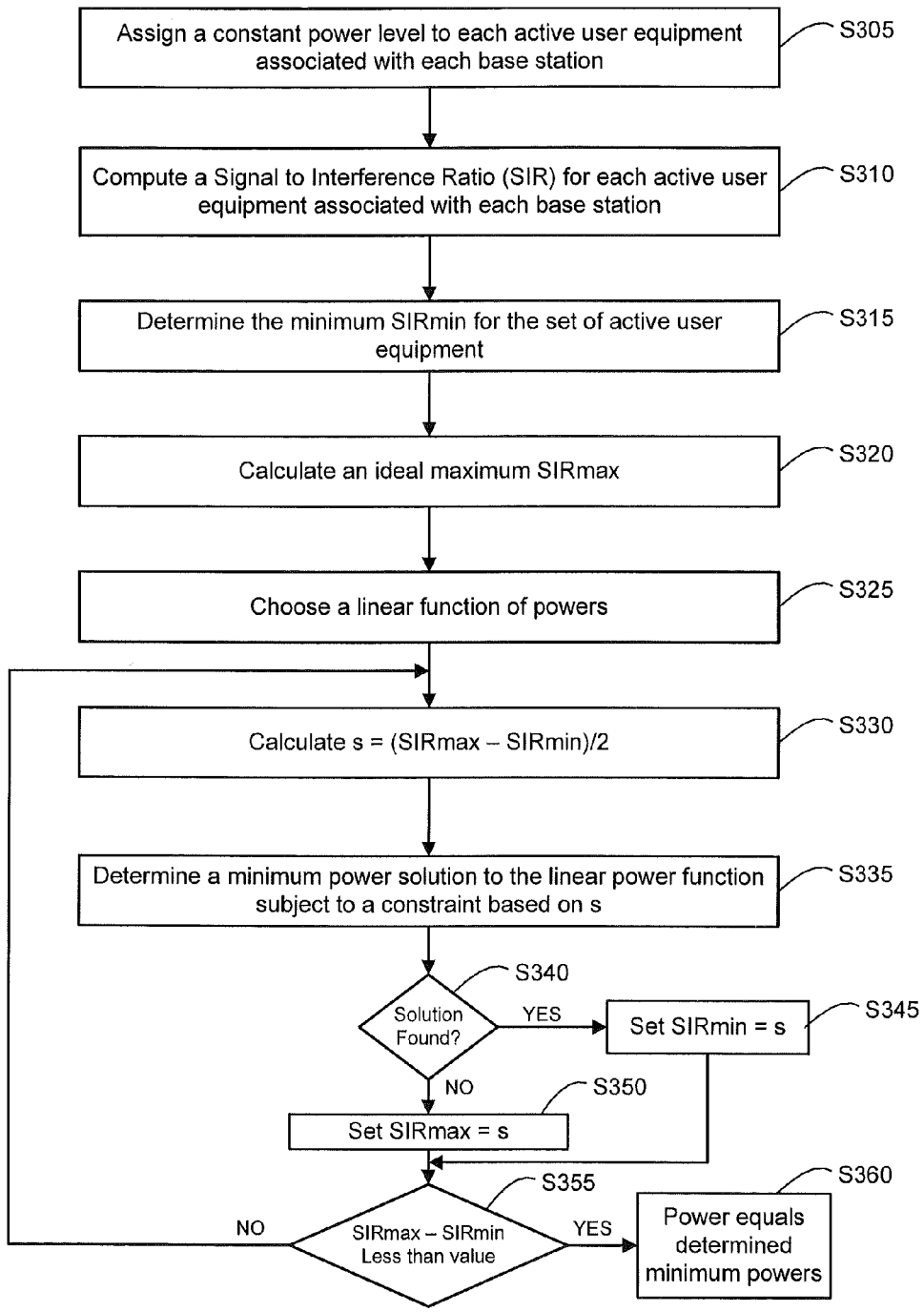
FIG. 3 illustrates a method for allocating power in a multiple-input-multiple-output (MIMO) wireless broadcast system according to example embodiments.

Example embodiments described below with regard to FIGS. 2 and 3 illustrate a method for choosing optimal powers $p_{lk}$ for a fixed k and for l=1, . . . , L. L is the total number of cells in the wireless network. The method also applies to the j-th, j≠k user equipments in the L cells.

The coefficients $\beta_{jkl}$ may change slowly. As a result, coefficients $\beta_{jkl}$ may be estimated by the corresponding base stations and user equipments. Coefficients $\beta_{jkl}$ may be updated regularly. Therefore, example embodiments assume that all $\beta_{jkl}$, j,l=1, . . . L, are available to all L base stations.

As is known, base stations may be connected with each other by a backbone transmission medium. Therefore, the base stations may send each other the corresponding coefficients $\beta_{jkl}$ making each of the corresponding coefficients $\beta_{jkl}$ available to all other base stations in the wireless network. Further, the backbone transmission medium provides a mechanism by which the base stations may exchange with other base station in the wireless network user equipment information. For example, transmit powers $p_{jk}$ and user equipment status (e.g., active or passive) may be exchanged via the backbone transmission medium.

The backbone media may also be used for transmitting coefficients $\beta_{jkl}$ to a central controller and for transmitting allocated powers $p_{lk}$ from the controller back to base stations. The network may include up to n controllers (n is the length of pilot signals). Further, for a given k the coefficients $\beta_{jkl}$ for all j,l=1, . . . , L, (L is the total number of cells) may be transmitted to one and the same k-th controller. In other words, the coefficients $\beta_{jkl}$ corresponding to the k-th user equipment, that are the users that share the same pilot signal $v_k$ in all cells, may be collected in the k-th controller.

At relatively the same time the coefficients $\beta_{jtl}$, j,l=1, . . . , L, (where t≠k) may be collected by the t-th controller. The k-th controller, as it is described below, may select N % of active users among the k-th users in L cells, and may compute optimal powers $p_{kl}$ for the active users. The k-th controller may then transmit these powers $p_{kl}$ to the corresponding base stations. Note that any base station may be the k-th controller. Alternatively, the k-th controller may organized as a separate unit connected to all base stations. Note also that several or all controllers may be combined in one and the same network unit.

Example embodiments maximize data rates for N % of the user equipments (e.g., N % of user equipments with the relatively best SIR). Therefore, example embodiments may partition k-th user equipments in L cells into active and passive users. For example, the k-th user equipment in the l-th cell may be determined to be passive if $p_{lk}$=0 for the k-th user equipment (e.g., the l-th base station is not currently transmitting to the k-th user equipment).

FIG. 2 illustrates a method for allocating power in a multiple-input-multiple-output (MIMO) wireless broadcast system according to example embodiments. The example embodiment described below with regard to FIG. 2 is described with regard to a base station controller. However, example embodiments are not limited thereto.

Referring to FIG. 2, in step S205 a controller, for example a controller (e.g., controller 410 described below with regard to FIG. 4) associated with a base station (e.g., base station 115-1) determines the active user equipments associated with each base station in a wireless network. For example, as described above, the k-th user equipment (e.g., user equipment 110-1) in the j-th cell may be determined to be passive if $p_{jk}=0$. By contrast, the k-th user equipment in the l-th cell (e.g., user equipment 110-2) may be determined to be active if $p_{lk} \neq 0$.

In step S210, the controller determines powers at which base stations in different cells transmit downlink signals to the k-th active user equipments associated with the corresponding base stations, such that each of the downlink signals is associated with a different active user and the base station is permitted to transmit downlink signals with different powers to the associated active user equipments.

For example, referring to FIG. 1, the controller may determine that the k-th user 110-2 in cell 1 is active and further determines the power $p\_\{lk\}$, with which the base station in cell 1 (e.g., base station 115-2) will transmit to this user. While the k-th user 110-1 in the j-th cell may be passive.

The power determination may be based on maximizing a power associated with the associated active user equipments and minimizing interferences for user equipments associated with another base station. The signal to interference ratio for a given user may be based on the transmitted associated downlink signals and the downlink signals transmitted by another base station sharing a same pilot sequence.

The signal to interference ratio may also be based on fading coefficients associated with the transmitted associated downlink signals and fading coefficients associated with downlink signals transmitted by the another base station.

Determining powers at which a base station transmits downlink signals may also include calculating a variable based on a maximum signal to interference ratio and a minimum signal to interference ratio, and determining a minimum power solution of a linear function of powers subject to a constraint based on the variable.

Each of the above examples is described in more detail with regard to FIG. 3 below.

Returning to FIG. 2, in step S215 the controller determines whether or not a number of active user equipment is less than or equal to a predetermined percentage. If a number of active user equipments is less than or equal to a predetermined percentage, then processing continues to step S220. Otherwise, processing moves to step S225. Determining if a number of active user equipments is less than or equal to a predetermined percentage is described in more detail above. For example, the predetermined percentage may be N=95%.

In step S220, the controller transmits the downlink signals associated with each active user at the powers determined in step S210. For example, in a MIMO wireless system (as described above) base station 115-1, 115-2 transmits an outgoing signal using multiple antennas by demultiplexing the outgoing signal into multiple Sub-signals and transmitting the sub-signals from separate antennas. Transmitting downlink signals is known to those skilled in the art and will not be described further for the sake of brevity.

If, in step S215, the controller determines a number of active user equipments is greater than a predetermined percentage, processing continues to step S225. In step S225, the controller drops the active user equipment with the largest determined power.

For example, the controller may set the transmission power for one of the associated user equipments (e.g., user equipment 110-1) to zero (0). Other methods for dropping a user equipment are known to those skilled in the art are known to those skilled in the art and will not be described further for the sake of brevity. After the user equipment is dropped, processing returns to step S210.

As one skilled in the art will appreciate, by dropping the user equipment with the largest power, SIR effects on other user equipment may be relatively reduced the most because the downlink signal transmitted at the highest power creates the strongest interference to other user equipments.

FIG. 3 illustrates a method for allocating power in a multiple-input-multiple-output (MIMO) wireless broadcast system according to example embodiments.

Referring to FIG. 3, in step S305 the controller assigns a constant power level to each active user associated with each base station in each cell of the wireless network. Alternatively, the controller can assign a constant power to each active user of some subset of the base stations and cells in the network. For example, each active user equipment 110-1 to 110-2 may be assigned $p_{lk}=p_{jk}=P$, where P is any constant (e.g., P=1).

In step S310, the controller calculates a Signal to Interference Ratio (SIR) for each active user equipment associated with each base station. For example, SIR may be calculated using equation 1 described above. In step S315, the controller calculates the minimum SIR ($S_{min}$) for the set of active user equipment. $S_{min}$ may be calculated with equal powers $p_{lk}=P$. Therefore, with optimal (unequal) powers $p_{lk}$, SIRs for active users will be at least as large as $S_{min}$. For example, $S_{min}$ may be calculated as follows:

$$s_{min} = \min\{SIR_{lk}, l=1, \ldots, K\} \quad \text{Equation 4:}$$

In step S320, the controller calculates an ideal maximum SIR ($S_{max}$). For example, any $S_{max}$ that is greater than any SIR that would optimally be achieved with optimal powers $p_{lk}$. For example $S_{max}$ may be calculated to be:

$$s_{max} = 1000 \cdot s_{min} \quad \text{Equation 5:}$$

In step S325, the controller chooses a linear function of powers. The linear function of power is a design choice decision. For example, the linear function of powers may be chosen to be:

$$f(p_{1k}, \ldots, p_{Kk}) = p_{1k} + p_{2k} + \ldots + p_{Kk}, \quad \text{Equation 6:}$$

where K is the number of active users sharing the same pilot sequence $v_k$.

In step S330, the controller calculates a variable s based on SIR. The formula for calculating s is a design choice decision. For example, the formula for calculating s may be:

$$s = (s_{max} - s_{min})/2 \quad \text{Equation 7:}$$

In step S335, the controller determines a minimum power solution to the linear power function chosen in step S325 (e.g., equation 6) subject to a constraint based on s and equation 1. For example, any linear programming method (e.g., the known simplex method) may be used to check feasibility of the solution of the following problem:

$$\text{Minimize } f(p_{1k}, \ldots, p_{Kk}) = p_{1k} + p_{2k} + \ldots + p_{Kk}$$

Subject to:
Equation 8 (based on equation 1):

$$\frac{p_{lk}\beta_{lkl}^2}{\sum_{j \neq l} p_{jk}\beta_{jkl}^2} \geq s, \, l=1, \ldots, K,$$

and $$p_{lk} \geq 0, \, l=1, \ldots, K \quad \text{Equation 9:}$$

If, in step S340, the controller determines a solution to the minimum power solution in step S335 is found, processing continues to step S345. Otherwise, processing moves to step S350. In step S345, the controller sets $S_{min}$ is to the value of s and processing moves to step S355. In step S350, the controller sets $S_{max}$ set to the value of s and processing moves to step S355. In step S355 the controller calculates $S_{max}-S_{min}$ and compares $S_{max}-S_{min}$ to a value. If $S_{max}-S_{min}$ is less than the value, processing moves to step S360. Otherwise, processing returns to step S330.

For example, If $S_{max}-S_{min}$ is relatively small, e.g., if $s_{max}-s_{min}$<0.5 dB, processing stops and the controller uses the found powers $p^*_{lk}$, l=1, . . . , K, otherwise the process is repeated (e.g., processing returns to step S330). In step S360, the controller uses the powers equal the determined minimum powers. For example, the determined powers of step S205 above are equal to the powers determined in step S335.

Although FIGS. 2 and 3 illustrate methods for allocating power in a multiple-input-multiple-output (MIMO) wireless broadcast system, example embodiments are not limited thereto. It will be understood by one of ordinary skill in the art that variations for allocating power based on for example alternative equations and formulas from those described above with regard to FIGS. 2 and 3.

Figure 4:
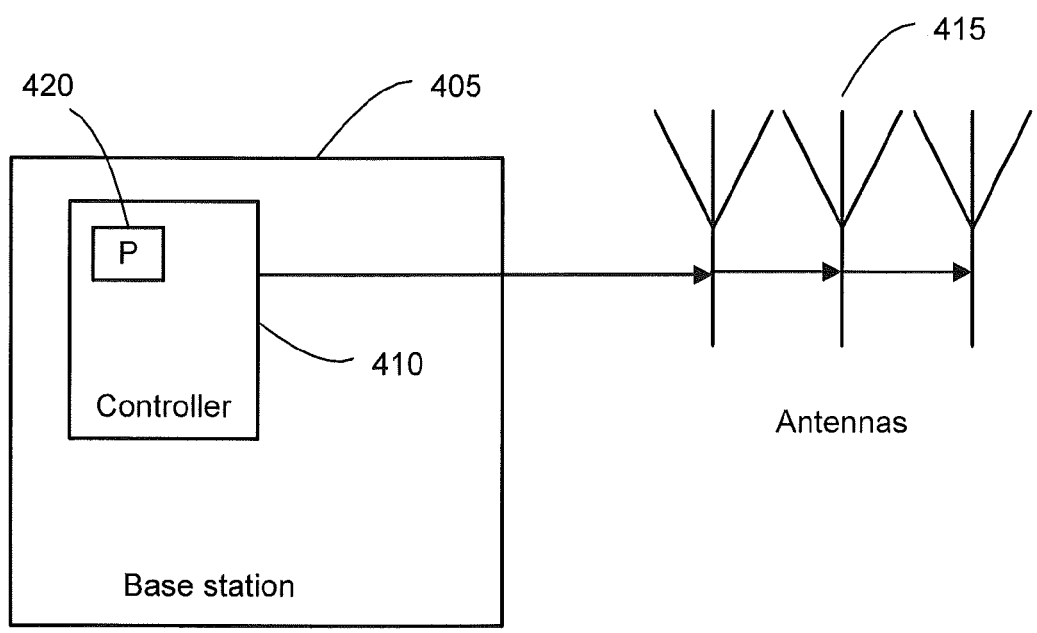
FIG. 4 illustrates a base station according to example embodiments.

FIG. 4 illustrates a base station according to example embodiments. Referring to FIG. 4, a base station 405 includes a controller 410. The controller 410 includes a processor (P) 420 that may be configured to perform the steps as described above with regard to FIGS. 2 and 3. Antennas 415 may transmit the associated downlink signals as described above with regard to, for example, step S220 as shown in FIG. 2. Although three antennas 415 are illustrated, example embodiments are not limited thereto. For example, Time Division Duplex (TDD) multi-cell multi-user (MIMO) wireless systems may include 100 to 400 and more antennas 415.

Although FIGS. 2-4 illustrate methods and an apparatus for allocating power in a multiple-input-multiple-output (MIMO) wireless broadcast system with reference to a base station controller, example embodiments are not limited thereto. For example, alternatively, each base station in the wireless broadcast system may make the power allocation determinations for each user equipment having an index k across each cell in the wireless broadcast system. In other words this base station will serve as a controller for the k-th users across all cells in the wireless broadcast system.

Still further, alternatively, a central network element or controller associated with the wireless broadcast system may make the power allocation determinations for each user equipment in all cells associated with the wireless broadcast system. Such variations will be understood by those skilled in the art and are not to be regarded as a departure from the invention, and all such modifications are intended to be included within the scope of the invention.

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method for allocating transmit power in a wireless network, the method comprising:
   assigning a transmit power to each active user equipment associated with a base station;
   calculating signal to interference ratios for each of the active user equipments associated with the base station;
   determining, based on the calculated signal to interference ratios, powers at which the base station transmits downlink signals to each active user equipment associated with the base station such that each of the downlink signals is associated with a different active user and the base station is permitted to transmit downlink signals with different powers to the associated active user equipments; and
   transmitting the associated downlink signals, by the base station, to the active user equipments at the determined powers.

2. The method of claim 1, wherein the determined powers are based on a power associated with the associated active user equipments and a signal to interference ratio for user equipment associated with another base station.

3. The method of claim 2, wherein the signal to interference ratios are based on downlink signals transmitted by the another base station and on the transmitted associated downlink signals.

4. The method of claim 3, wherein the signal to interference ratio is reduced between the transmitted associated downlink signals and the downlink signals transmitted by the another base station sharing a same pilot sequence.

5. The method of claim 3, wherein the signal to interference ratio is based on fading coefficients associated with the transmitted associated downlink signals and fading coefficients associated with downlink signals transmitted by the another base station.

6. The method of claim 5, wherein $$SIR_{lk} = \frac{p_{lk}\beta_{lkl}^2}{\sum_{j \neq l} p_{jk}\beta_{jkl}^2}, l = 1, \ldots, K,$$

where,
$SIR_{lk}$ is the signal to interference ratio for the $k^{th}$ user in the $l^{th}$ cell,
K is the number of active users that share the same pilot sequence with the $k^{th}$ user in the $l^{th}$ cell,
$p_{lk}$ is the transmission power for the $k^{th}$ user in the $l^{th}$ cell,
$\beta_{lkl}$ is the fading coefficient between the $l^{th}$ cell transmission antennas and the $k^{th}$ user in the $l^{th}$ cell,
$p_{jk}$ is the transmission power for the $k^{th}$ user in the $j^{th}$ cell, and
$\beta_{jkl}$ is the fading coefficient between the $j^{th}$ cell transmission antennas and the $k^{th}$ user in the $l^{th}$ cell.

7. The method of claim 1, wherein the determining powers at which a base station transmits downlink signals step includes,
  calculating a variable based on a maximum signal to interference ratio and a minimum signal to interference ratio, and
  determining a minimum power solution of a linear power function subject to a constraint based on the variable.

8. The method of claim 7, wherein
s=(SIR$_{max}$−SIR$_{min}$)/2 under the constraint of $$\frac{p_{lk}\beta_{lkl}^2}{\sum_{j\neq l} p_{jk}\beta_{jkl}^2} \geq s, l = 1, \ldots, K,$$

$p_{lk} \geq 0$, l=1, ..., K, where
s is the variable,
K is the number of active users,
$p_{lk}$ is the transmission power for the k$^{th}$ user in the l$^{th}$ cell,
$\beta_{lkl}$ is the fading coefficient between the l$^{th}$ cell transmission antennas and the k$^{th}$ user in the l$^{th}$ cell,
$p_{jk}$ is the transmission power for the k$^{th}$ user in the j$^{th}$ cell, and
$\beta_{jkl}$ is the fading coefficient between the j$^{th}$ cell transmission antennas and the k$^{th}$ user in the l$^{th}$ cell.

9. The method of claim 1, further comprising:
  dropping an active user equipment having a highest determined power if a number of active user equipments associated with the wireless network is greater than a percentage of users.

10. The method of claim 9, wherein the percentage of users is based on a number of active user equipments having a relatively low signal to interference ratio and a number of active user equipments having a relatively high signal to interference ratio.

11. A controller, comprising:
  a processor configured to,
    assign a transmit power to each active user equipment associated with a base station,
    calculate signal to interference ratios for each of the active user equipments associated with the base station, and
    determine, based on the calculated signal to interference ratios, powers at which the base station transmits downlink signals to each active user equipment associated with the base station such that each of the downlink signals is associated with a different active user and the base station is permitted to transmit downlink signals with different powers to the associated active user equipments.

12. The controller of claim 11, wherein the processor determines the powers based on a power associated with the associated active user equipments and a signal to interference ratio for user equipment associated with another base station.

13. The controller of claim 12, wherein the signal to interference ratios are based on downlink signals transmitted by the another base station and on the transmitted associated downlink signals.

14. The controller of claim 13, wherein the signal to interference ratio is reduced between the transmitted associated downlink signals and the downlink signals transmitted by the another base station sharing a same pilot sequence.

15. The controller of claim 13, wherein the signal to interference ratio is based on fading coefficients associated with the transmitted associated downlink signals and fading coefficients associated with downlink signals transmitted by the another base station.

16. The controller of claim 15, wherein $$SIR_{lk} = \frac{p_{lk}\beta_{lkl}^2}{\sum_{j\neq l} p_{jk}\beta_{jkl}^2}, l = 1, \ldots, K,$$

where,
SIR$_{lk}$ is the signal to interference ratio for the k$^{th}$ user in the l$^{th}$ cell,
K is the number of active users that share the same pilot sequence with the k$^{th}$ user in the l$^{th}$ cell,
$p_{lk}$ is the transmission power for the k$^{th}$ user in the l$^{th}$ cell,
$\beta_{lkl}$ is the fading coefficient between the l$^{th}$ cell transmission antennas and the k$^{th}$ user in the l$^{th}$ cell,
$p_{jk}$ is the transmission power for the k$^{th}$ user in the j$^{th}$ cell, and
$\beta_{jkl}$ is the fading coefficient between the j$^{th}$ cell transmission antennas and the k$^{th}$ user in the l$^{th}$ cell.

17. The controller of claim 11, wherein the processor determines powers at which the base station transmits downlink signals by,
  calculating a variable based on a maximum signal to interference ratio and a minimum signal to interference ratio, and
  determining a minimum power solution of a linear power function subject to a constraint based on the variable.

18. The controller of claim 17, wherein
s=(SIR$_{max}$−SIR$_{min}$)/2 under the constraint of $$\frac{p_{lk}\beta_{lkl}^2}{\sum_{j\neq l} p_{jk}\beta_{jkl}^2} \geq s, l = 1, \ldots, K,$$

where
$p_{lk} \geq 0$, l=1, ..., K,
s is the variable,
c is the constraint,
K is the number of active users,
$p_{lk}$ is the transmission power for the k$^{th}$ user in the l$^{th}$ cell,
$\beta_{lkl}$ is the fading coefficient between the l$^{th}$ cell transmission antennas and the k$^{th}$ user in the l$^{th}$ cell,
$p_{jk}$ is the transmission power for the k$^{th}$ user in the j$^{th}$ cell, and
$\beta_{jkl}$ is the fading coefficient between the j$^{th}$ cell transmission antennas and the k$^{th}$ user in the l$^{th}$ cell.

19. The controller of claim 11, wherein the processor drops an active user equipment having a highest determined power if a number of active user equipments associated with the wireless network is greater than a percentage of users.

20. The controller of claim 19, wherein the percentage of users is based on a number of active user equipments having a relatively low signal to interference ratio and a number of active user equipments having a relatively high signal to interference ratio.

* * * * *